United States Patent
Chen et al.

(10) Patent No.: US 9,828,294 B2
(45) Date of Patent: Nov. 28, 2017

(54) SINTERED CLAY MINERAL MATRIX DOPED WITH RARE EARTH METALS, TRANSITION METALS, OR POST-TRANSITION METALS

(71) Applicant: National University of Singapore, Singapore (SG)

(72) Inventors: Xinwei Chen, Singapore (SG); Liang Hong, Singapore (SG); Yi'en Zhou, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 15/109,538

(22) PCT Filed: Jan. 8, 2015

(86) PCT No.: PCT/SG2015/000003
§ 371 (c)(1),
(2) Date: Jul. 1, 2016

(87) PCT Pub. No.: WO2015/108484
PCT Pub. Date: Jul. 23, 2015

(65) Prior Publication Data
US 2016/0326056 A1  Nov. 10, 2016

Related U.S. Application Data

(60) Provisional application No. 61/928,696, filed on Jan. 17, 2014.

(51) Int. Cl.
| | |
|---|---|
| *C04B 33/04* | (2006.01) |
| *B01D 67/00* | (2006.01) |
| *B01D 71/02* | (2006.01) |
| *C04B 38/00* | (2006.01) |
| *C04B 33/13* | (2006.01) |
| *C04B 33/32* | (2006.01) |
| *C04B 111/00* | (2006.01) |

(52) U.S. Cl.
CPC .......... *C04B 33/04* (2013.01); *B01D 67/0041* (2013.01); *B01D 67/0083* (2013.01); *B01D 71/02* (2013.01); *B01D 71/024* (2013.01); *C04B 33/131* (2013.01); *C04B 33/1305* (2013.01); *C04B 33/1315* (2013.01); *C04B 33/32* (2013.01); *C04B 38/0064* (2013.01); *C04B 2111/00801* (2013.01); *C04B 2235/3227* (2013.01); *C04B 2235/3284* (2013.01); *C04B 2235/349* (2013.01); *C04B 2235/602* (2013.01); *C04B 2235/6021* (2013.01); *C04B 2235/6025* (2013.01); *C04B 2235/6027* (2013.01); *C04B 2235/656* (2013.01); *C04B 2235/661* (2013.01)

(58) Field of Classification Search
CPC ......... C04B 33/04; C04B 33/02; C04B 33/36; C04B 38/00; C04B 38/0038
See application file for complete search history.

(56) References Cited

U.S. PATENT DOCUMENTS

| | | | | |
|---|---|---|---|---|
| 4,742,033 A | * | 5/1988 | Harris | ................. B01J 29/049 502/68 |
| 5,264,404 A | * | 11/1993 | Takahama | ............ B01D 53/864 502/5 |
| 2010/0243557 A1 | * | 9/2010 | Tomita | ............... B01D 67/0046 210/490 |
| 2010/0273644 A1 | | 10/2010 | Hagemeyer et al. | |

FOREIGN PATENT DOCUMENTS

| | | |
|---|---|---|
| WO | WO-2008/008828 A2 | 1/2008 |
| WO | WO-2007/089230 A3 | 9/2008 |

OTHER PUBLICATIONS

Sarbatly. Effect ofKaolin/pesfRatio and Sintering Temperature on Pore Size and Porosity of the Kaolin Membrane Support. Journal of Applied Sciences 11 (13): 2306-2312, 2011.*
Davidovic et al "Nanocomposite Based on Natural Materials" Advances in Diverse Industrial Applications of Nanocomposites Chapter 3, pp. 37-57, 2011.
Li et al "Synthesis and Characterization of Ln-ZSM-5/MCM-41 (LN=La, Ce) by Using Kaolin as Raw Material" Applied Clay Science vol. 50, pp. 81-86, 2010.
Restrepo et al "Mechanochemically Enhanced Synthesis of Isomorphously Substituted Kaolinites" Applied Clay Science vol. 52, pp. 386-391, 2011.
Sarbatly "Effect of Kaolin/pesf Ratio and Sintering Temperature on Pore Size and Porosity of the Kaolin Membrane Support" Journal of Applied Sciences vol. 11, pp. 2306-2312, 2011.
Skaribas et al "Controlled Architecture of Solids with Micro- and Meso-porosity Obtained by Pillaring of Montmorillonite with an $LaNiO_x$ Binary Oxide" Journal of the Chemical Society Faraday Transactions vol. 88, pp. 3217-3223, 1992.
Tian et al "Enhanced Adsorption Removal of Phosphate from Water by Mixed Lanthanum/Aluminum Pillared Montmorillonite" Chemical Engineering Journal vol. 151, pp. 141-148, 2009.
Wang et al "Preparation of Kaolinite-Based La-Doped Nano Titanium Dioxide Photocatalysts by Electrostatic Self Assembly Method" Journal of Synthetic Crystals vol. 39, pp. 1381-1385, 2010.

* cited by examiner

*Primary Examiner* — Noah Wiese
(74) *Attorney, Agent, or Firm* — Cesari and McKenna, LLP

(57) ABSTRACT

A porous sintered clay mineral matrix that contains aluminum and is doped with 0.1-20 mol %, based on the amount of the aluminum, one or more transition metals, one or more post-transition metals, one or more rare earth metals, or a combination thereof. An example is a kaolinite matrix. The matrix can be made from a calcined clay mineral powder that contains aluminum and is doped with at least one of these metals. Also disclosed are methods of preparing the above-described matrix and powder.

22 Claims, No Drawings

SINTERED CLAY MINERAL MATRIX DOPED WITH RARE EARTH METALS, TRANSITION METALS, OR POST-TRANSITION METALS

CROSS REFERENCE TO RELATED APPLICATIONS

This application is the National Stage of International Application No. PCT/SG2015/000003, filed on Jan. 8, 2015, which claims the benefit of US Provisional Application No. 61/928,696, filed on Jan. 17, 2014. The contents of both applications are hereby incorporated by reference in their entirety.

BACKGROUND OF THE INVENTION

Clay mineral, also known as aluminium phyllosilicate, includes, among others, kaolinite, halloysite, illite, montmorillonite, and chlorite. It is one of the most commonly found minerals on earth.

Clay mineral has been widely used in various industrial applications. For example, in the paper industry, kaolinite, also known in raw form as kaolin, is applied as a coating composition on the surface of paper to allow for sharp photographic illustrations and vibrant color prints. In another instance, kaolinite is used as a filler in natural and synthetic rubber products to enhance their strength, abrasion resistance, and rigidity.

Yet, clay mineral, e.g., kaolinite, is usually deemed unsuitable as a material for inorganic membranes. Kaolinite's sintering temperature is no higher than 1200° C. Further, the structure of kaolinite, which comprises of randomly oriented stacking of individual flakes, makes it difficult to achieve good contact between the flakes during sintering. Consequently, as a matrix, kaolinite has a poor sinterability and a poor mechanical strength.

It would be advantageous to use clay mineral, which is abundant and thus inexpensive, to manufacture high-quality inorganic membranes.

SUMMARY

This invention provides a sintered clay mineral matrix, particularly, a sintered kaolinite matrix, that has an unexpectedly high mechanical strength and an unexpectedly high fluid permeability, thus suitable as a material for inorganic membranes and filters.

One aspect of this invention relates to a sintered clay mineral matrix that is porous, contains aluminum, and is doped with 0.1-20 mol %, based on the amount of aluminum, one or more transition metals, one or more post-transition metals, one or more rare earth metals, or a combination thereof. The matrix can be a membrane. The sintered clay mineral matrix can be a sintered kaolinite matrix. Examples of a transition metal include titanium, chromium, iron, cobalt, manganese and yttrium. Zinc is an example of a post-transition metal and lanthanum is an example of a rare earth metal.

In one embodiment, the matrix is a sintered kaolinite matrix doped with lanthanum (e.g., 5-15 mol %) and has a mechanical strength rate of greater than 5 MPa, a Darcy's permeability rate of greater than $5.00E-014$ $m^2$, and two distinctive pore-diameter distributions: one in a range of 4 to 11 μm and the other less than 3 μm.

In another embodiment, the matrix is a sintered kaolinite matrix doped with zinc (e.g., 5-20 mol %) and has a mechanical strength rate of greater than 30 MPa.

Also within the scope of this invention is a calcined clay mineral powder that contains aluminum and is doped with 0.1-20 mol %, based on the amount of aluminum, one or more transition metals, one or more post-transition metals, one or more rare earth metals, or a combination thereof. The calcined clay mineral powder can be a calcined kaolinite powder. Preferably, the powder is doped with lanthanum 5-15 mol % or zinc 5-20 mol %.

Yet another aspect of this invention relates to a method of preparing a polymeric support. The method includes the following steps: (i) dissolving one or more salts of post-transition metals (e.g., zinc nitrate), one or more salts of rare earth metals (e.g., lanthanum nitrate), or a combination thereof in water to form a solution; (ii) adding an organic solvent to the solution to form a second solution; (iii) mixing clay mineral with the second solution to form a homogenous mixture; (iv) heating the homogenous mixture at 50-150° C. for 12-72 hours to obtain a dried lump; (v) calcining the dried lump at 500-800° C. for 1-10 hours, and then cooling it to an ambient temperature, wherein both the heating and cooling are each conducted at a rate of 1-20° C./min; and (vi) grinding the calcined lump to obtain a metal-doped clay mineral powder.

The above-described method can include subsequent steps as follows: (vii) mixing the metal-doped clay mineral powder with a solution to form a second homogenous mixture, wherein the solution is prepared by dissolving 1-10 wt % polymeric binder in a pure or mixed organic solvent and includes 0.1 to 1 wt % additives that is a non-ionic surfactant, a deflocculating agent, and a plasticizer; (viii) drying the second homogenous mixture at an ambient temperature for 1-10 hours to form a cake; (ix) grinding the cake to obtain a powder; (x) molding the powder to form a ceramic green body by forming techniques of compression molding, extrusion, slip casting or tape casting; and (xi) sintering the green body at 1000-1400° C. for 2-10 hours, and then cooling it to an ambient temperature, wherein both the heating and cooling are each conducted at a rate of 1-20° C./min, to obtain a metal-doped clay mineral matrix.

The metal-doped clay mineral powder or matrix prepared by the above-described method can be a metal-doped kaolinite powder or matrix.

The details of the invention are set forth in the description below. Other features, objects, and advantages of the invention will be apparent from the description and from the claims.

DETAILED DESCRIPTION

The clay mineral powder and matrix of this invention are exemplified respectively by a kaolinite powder and a kaolinite matrix each containing one or more dopants with a total content of 0.1-20 mol %, based on the amount of aluminum in the kaolinite. The dopants can be selected from transition metals, post-transition metals, and rare earth metals.

Doping kaolinite powder with zinc, a post-transition metal, or lanthanum, a rare earth metal, was found by us to have an influence on the final morphology of a sintered matrix prepared from the powder. The zinc or lanthanum-doped sintered matrix exhibits an unexpectedly high mechanical strength and/or fluid flux rate.

Preferably, lanthanum-doped kaolinite matrices of this invention have a mechanical strength rate of greater than 5.

MPa and the zinc-doped matrices have a mechanical strength rate of greater than 30 MPa.

A mechanical strength rate is measured by the modulus of rupture (MOR) value obtained in a 3-point bending test. Three identical pellets are fabricated for each of the matrix tested to obtain a mean value for the mechanical strength. The circular pellets are cut into rectangular test specimens with a diamond saw and the sides are polished using fine sand paper. These test specimens are placed in a fixture with a span length of 20 mm to carry out the bending experiment. The MOR ($\sigma$) for a rectangular test specimen can be calculated using the following formula:

$$\sigma = \frac{3 * FS * L_{span}}{2 * b * d^2}$$

FS is the fracture strength (Pa), $L_{span}$ is the span length of the fixture (m), d is the thickness of the specimen (m) and b is the width (m).

Preferably, lanthanum-doped kaolinite matrices of this invention have a Darcy's permeability rate of greater than 5.00E-014 $m^2$.

A Darcy's permeability rate of a matrix is obtained in an air permeation test using sintered pellets of the matrix. Before the experiment, the edges of the pellet are sealed with double aluminum sticker to create a gas-tight annulus. The surface area of the pellet exposed to the air is 2.01 $cm^2$ and purified compressed air is used for the air permeability test. The gas pressures are measured using manometers and the volumetric flow rate is measured by a gas flowmeter. The dynamic viscosity of compressed gas used for the calculation is estimated by Sutherland equation to be $1.86 \times 10^{-5}$ Pa·s. The permeability of a porous medium can be expressed by Darcy's law:

$$-\frac{dP}{dx} = \frac{\mu}{k_1} v_s$$

In the above equation, $-dP/dx$ is the pressure gradient along the flow direction, $\mu$ is the absolute viscosity of the fluid, vs is the superficial fluid velocity, and $k_1$ is usually known as Darcy's permeability. The superficial fluid velocity is defined by:

$$v_s = \frac{Q}{A}$$

Q is the volumetric flow rate and A is the exposed surface area of the porous medium perpendicular to the flow direction. Note that three identical pellets are used to obtain an average permeability for each of the sample.

The pores in the matrix doped with lanthanum have two distinctive diameter distributions: one in a range of 4 to 11 μm and the other less than 3 μm.

The pore size distribution of the sintered matrix is measured by mercury porosimetry.

The matrix of this invention can be a membrane (e.g., a flat sheet), a cubic block, or of any other desired shape. It can be used, e.g., as a membrane or filter for water purification in the waste industry, as a catalyst support in the food, energy, or gas industry, or as a material in the building industry.

Described below are exemplary procedures of preparing a calcined clay mineral powder (more specifically, a calcined kaolinite powder) and a sintered clay mineral matrix (more specifically, a sintered kaolinite matrix) of this invention.

Lanthanum or zinc nitrate is initially dissolved in 10 ml of deionized water. After obtaining a clear solution, 8 ml of ethanol is then added. Finally, 5 g of kaolin is added and the resulting mixture is mechanically stirred for 30 min. The mixture is then dried at 80° C. for 6 hours and 120° C. for another 6 hours to completely remove both the water and ethanol. The dried lump is then heated at 650° C. for 6 hours in a furnace, and then cooled to an ambient temperature, with the heating and cooling rates both set at 2.5° C./min. The lump is then ground to obtain the fine powder of lanthanum or zinc-doped kaolinite.

In preparation of a binder coated kaolinite powder suitable to be mold into either a green body, a polymer binder solution comprising of 5 wt % of polyvinyl butyral (PVB) in equal volumetric amount of solvent of 2-butanone and toluene is formulated. Further, small amounts of additives, such as a non-ionic surfactant (e.g., Sorbitan Monostearate), a deflocculating agent (e.g., Menhaden fish oil), and a plasticizer (e.g., dibutyl phthalate), are added to the formulation. For example, on the basis of 10 g of lanthanum-doped kaolinite, 0.5 g of PVB in 10 ml of solvent and 0.1 g of each of the additives are prepared. To further increase the porosity of the sintered matrix, a sacrificial template in the form of either a porogen or carbon black can be introduced to serve as a pore former, the amount of which usually ranges from 2 wt % to 10 wt % of the ceramic powder.

The procedure is started by dissolving the required amount of PVB in the solvent followed by the additives. Continuous agitation is required to achieve a homogenous solution. Subsequently, the required amount of pore formers is then introduced into the solution followed by the ceramic powder. Mechanical stirring is maintained throughout this procedure until a homogenous mixture is achieved. Finally, the solvent is evaporated by flowing air and dried at 50° C. for 2 hours, leaving behind solid lumps. The lumps are then ground and sieved to obtain fine binder-coated kaolinite powder.

The fine binder-coated kaolinite powder is then subjected to compression molding. Depending on the shape of the desired final sintered product, the compression molding and shaping can be carried out with a hydraulic press, extruder, cold isostatic press, or hot isostatic press. Other methods of ceramic shaping can be applied. However, the binder formulation needs to be modified in order to cater for it.

Finally, the demolded ceramic green body is sintered to achieve the required strength and porosity for the required application.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

Fabrication of Sintered Kaolinite Matrix Doped with Lanthanum 10 Mol %

7.865 g of lanthanum nitrate (10 mol %) was first dissolved in 10 ml of deionized water. After obtaining a clear solution, 8 ml of ethanol was then added. Finally, 10 g of kaolin was added and the resulting mixture was mechanically stirred for 30 min. The mixture was then dried at 80° C. for 6 hours and 120° C. for another 6 hours to completely remove both the water and ethanol. The dried lump was then heated at 650° C. for 6 hours in a furnace, and cooled to an ambient temperature, with the heating and cooling rates set at 2.5° C./min. The lump was then ground to obtain the fine powder of lanthanum-doped kaolinite.

On the basis of 10 g of lanthanum-doped kaolinite powder, 0.5 g of PVB was added into 10 ml of mixed solvent of equal volumetric amount of 2-butanone and toluene. 0.1 g of each additive (i.e., Sorbitan Monostearate, Menhaden fish oil, and dibutyl phthalate) was then added into the solution. 0.5 g of starch, as a pore-former, and 10 g of lanthanum-doped kaolinite powder were introduced into the solution and stirred continuously to obtain a homogenous-mixture. The solvent was then evaporated by flowing air and dried at 50° C. for 2 hours, leaving behind solid lumps. The lumps were then ground and sieve to obtain fine binder-coated kaolinite powder.

1.5 g of the fine binder-coated kaolinite powder was introduced into a die set (2.5 cm diameter) and then subjected to hydraulic press at 4 metric tons for 10 min. After demolding, the green pellet was then carefully removed from the die set, placed in a cubic furnace, heated to a sintering temperature of 1150° C. for 6 hours, and then cooled to an ambient temperature. A heating and cooling rate of 1.5° C./min was used. Eventually, a sintered ceramic article was obtained.

Fabrication of Sintered Kaolinite Matrices Doped with Lanthanum 5, 15, and 20 Mol %

Sintered kaolinite matrices doped with lanthanum 5, 15, and 20 mol % were made as described above except adjusting the initial amounts of lanthanum nitrate.

The effect of the incorporation of lanthanum into the kaolinite powder was first evident after the calcination heating step at 650° C., as shown by X-ray diffraction (XRD) spectrums. A comparison of the spectrums between the pristine kaolinite and those with four different levels (5, 10, 15, and 20 mol %) of lanthanum doping indicated the penetration of lanthanum into the double layer of the kaolin and emergence of a new crystallinity phase. Images derived from electron microscope (EM) confirmed this observation as the penetration of lanthanum ions brings about new physical change to the flake-like morphology often associated with the pristine kaolinite.

The structural change in the lanthanum-doped kaolinite powder was eventually translated to changes in a sintered matrix prepared with the powder. The EM images of the lanthanum-doped matrix showed macro-"pot-holes" and grain boundaries between the sintered particles as oppose to the poorly sintered flake-like particles in the pristine kaolinite matrix. The phenomenon led to the conclusion that the presence of lanthanum created reacting sites for the aluminum ions to diffuse out of the kaolinite crystal structure.

Similar observations were also made with the Zn-doped kaolin matrix.

The macro "pot-holes" served as connecting bridges to create more inter-connected pore channels in the lanthanum-doped matrix. Its pore sizes reflected this by showing two distributions, one in a range of 4 to 11 μm and the other less than 3 μm. The pore sizes less than 3 μm could be attributed to the inter-particle spacing of the matrix as observed for the pristine matrix. The increase in doping level resulted in an initial increase in the pore size from 0 mol % to 10 mol %, attaining maxima at 10 mol % doping, and decreased substantially after that. In fact, these greater pore sizes totally disappeared at 20 mol % doping.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A sintered clay mineral matrix, wherein the matrix is porous, contains aluminum, and is doped with 0.1-20 mol %, based on the amount of the aluminum, one or more transition metals, one or more post-transition metals, one or more rare earth metals, or a combination thereof, in which at least zinc or lanthanum is a dopant.

2. The sintered clay mineral matrix of claim 1, wherein the transition metal is titanium, chromium, iron, cobalt, manganese or yttrium, the post-transition metal is zinc, and the rare earth metal is lanthanum.

3. The sintered clay mineral matrix of claim 2, wherein the matrix is a membrane.

4. The sintered clay mineral matrix of claim 3, wherein the matrix is doped with lanthanum or zinc.

5. The sintered clay mineral matrix of claim 4, wherein the matrix is doped with lanthanum 5-15 mol %.

6. The sintered clay mineral matrix of claim 4, wherein the sintered clay mineral matrix is a sintered kaolinite matrix.

7. The sintered clay mineral matrix of claim 6, wherein the matrix is doped with lanthanum and the pores in the matrix have two distinctive diameter distributions, one in a range of 4 to 11 inn and the other less than 3 μm.

8. The sintered clay mineral matrix of claim 6, wherein the matrix is doped with lanthanum and has a mechanical strength rate of greater than 5 MPa and a Darcy's permeability rate of greater than 5.00E-014 $m^2$.

9. The sintered clay mineral matrix of claim 4, wherein the matrix is doped with zinc 5-20 mol %.

10. The sintered clay mineral matrix of claim 6, wherein the matrix is doped with zinc and has a mechanical strength rate of greater than 30 MPa.

11. A calcined clay mineral powder, wherein the powder contains aluminum and is doped with 0.1-20 mol %, based on the amount of the aluminum, one or more transition metals, one or more post-transition metals, one or more rare earth metals, or a combination thereof, in which at least zinc or lanthanum is a dopant.

12. The calcined clay mineral powder of claim 11, wherein the transition metal is titanium, chromium, iron, cobalt, manganese or yttrium, the post-transition metal is zinc, and the rare earth metal is lanthanum.

13. The calcined clay mineral powder of claim 12, wherein the powder is doped with lanthanum or zinc.

14. The calcined clay mineral powder of claim 13, wherein the powder is doped with lanthanum 5-15 mol %.

15. The calcined clay mineral powder of claim 13, wherein the powder is doped with zinc 5-20 mol %.

16. The calcined clay mineral powder of claim 13, wherein the calcined clay mineral powder is a calcined kaolinite powder.

17. A method of preparing a clay mineral material, the method comprising:

dissolving one or more salts of transition metals, one or more salts of post-transition metals, one or more salts of rare earth metals, or a combination thereof in water to form a solution;

adding an organic solvent to the solution to form a second solution;

mixing clay mineral with the second solution to form a homogenous mixture;

heating the homogenous mixture at 50-150° C. for 12-72 hours to obtain a dried lump;

calcining the dried lump at 500-800° C. for 1-10 hours, and then cooling it to an ambient temperature, wherein both the heating and cooling are each conducted at a rate of 1-20° C./min; and grinding the calcined lump to obtain a metal-doped clay mineral powder.

18. The method of claim 17, wherein the transition metal is titanium, chromium, iron, cobalt, manganese or yttrium, the post-transition metal is zinc, and the rare earth metal is lanthanum.

19. The method of claim 18, wherein the clay mineral is kaolinite.

20. The method of claim 18, wherein the salt is lanthanum nitrate or zinc nitrate.

21. The method of claim 17, further comprising:

mixing the metal-doped clay mineral powder with a solution to form a second homogenous mixture, wherein the solution is prepared by dissolving 1-10 wt % polymeric binder in a pure or mixed organic solvent and includes 0.1 to 1 wt % additives that is a non-ionic surfactant, a deflocculating agent, and a plasticizer;

drying the second homogenous mixture at an ambient temperature for 1-10 hours to form a cake;

grinding the cake to obtain a powder;

molding the powder to form a ceramic green body by forming techniques of compression molding, extrusion, slip casting or tape casting; and sintering the green body at 1000-1400° C. for 2-10 hours, and then cooling it to an ambient temperature, wherein both the heating and cooling are each conducted at a rate of 1-20° C./min, to obtain a metal-doped clay mineral matrix.

22. The method of claim 21, wherein the clay mineral is kaolinite.

* * * * *